United States Patent
Siraj et al.

(10) Patent No.: US 11,879,412 B2
(45) Date of Patent: Jan. 23, 2024

(54) TURBOMACHINE FAN

(71) Applicant: SAFRAN AIRCRAFT ENGINES, Paris (FR)

(72) Inventors: Anwer Siraj, Moissy-Cramayel (FR); Clément Bourolleau, Moissy-Cramayel (FR); Serge Domingues, Moissy-Cramayel (FR); Vincent Pascal Fiore, Moissy-Cramayel (FR); Florent Louis André Rognin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 372 days.

(21) Appl. No.: 17/428,247

(22) PCT Filed: Feb. 7, 2020

(86) PCT No.: PCT/FR2020/000027
§ 371 (c)(1),
(2) Date: Aug. 3, 2021

(87) PCT Pub. No.: WO2020/161403
PCT Pub. Date: Aug. 13, 2020

(65) Prior Publication Data
US 2022/0170431 A1    Jun. 2, 2022

(30) Foreign Application Priority Data
Feb. 7, 2019   (FR) ........................................ 1901235

(51) Int. Cl.
*F02C 7/045*    (2006.01)
*F02C 7/24*     (2006.01)
(Continued)

(52) U.S. Cl.
CPC ................ *F02K 3/06* (2013.01); *F01D 11/12* (2013.01); *F01D 21/045* (2013.01); *F02K 1/827* (2013.01);
(Continued)

(58) Field of Classification Search
CPC .... F02C 7/045; F02C 7/04; F02C 7/24; F02K 3/06; F02K 1/827; F02K 1/82;
(Continued)

(56) References Cited
U.S. PATENT DOCUMENTS 5,259,724 A    11/1993  Liston et al.
7,563,069 B2 *  7/2009  Harper ................... F02C 7/045
                                                      415/173.1
(Continued)

FOREIGN PATENT DOCUMENTS

DE    10 2015 113 685 A1   6/2016
FR         2636378 A1 *    3/1990    ............. F01D 9/042
(Continued)

OTHER PUBLICATIONS

International Search Report dated May 13, 2020, issued in corresponding International Application No. PCT/FR2020/000027, filed Feb. 7, 2020, 7 pages.
(Continued)

*Primary Examiner* — Edgardo San Martin
(74) *Attorney, Agent, or Firm* — CHRISTENSEN O'CONNOR JOHNSON KINDNESS PLLC

(57) ABSTRACT

A ring assembly has a housing made of woven composite material carrying on its radially inner face an acoustic panel with a cellular structure covered with a composite material. The housing includes at least one radial recess in which is engaged at least one radially outwardly projecting part of the radially outer face of the acoustic panel.

9 Claims, 3 Drawing Sheets

(51) Int. Cl.
  *F02K 1/82* (2006.01)
  *F01D 25/24* (2006.01)
  *B64D 33/02* (2006.01)
  *F02K 3/06* (2006.01)
  *F01D 11/12* (2006.01)
  *F01D 21/04* (2006.01)

(52) U.S. Cl.
  CPC .. *B64D 2033/0206* (2013.01); *F05D 2220/36* (2013.01); *F05D 2240/14* (2013.01); *F05D 2260/96* (2013.01); *F05D 2300/6034* (2013.01)

(58) Field of Classification Search
  CPC ......... F05D 2250/181; F05D 2250/182; F05D 2250/292; F05D 2250/294; F05D 2260/963; F05D 2260/96; F05D 2230/64; F01D 21/045; F01D 25/24; B64D 33/02; B64D 2033/0206
  See application file for complete search history.

(56) References Cited

U.S. PATENT DOCUMENTS

| | | | | |
|---|---|---|---|---|
| 9,932,897 | B2 * | 4/2018 | Riou | F02C 7/045 |
| 10,473,030 | B2 * | 11/2019 | Heeter | F02C 7/045 |
| 10,502,134 | B2 * | 12/2019 | Baudoin | F04D 19/002 |
| 11,635,026 | B1 * | 4/2023 | Heeter | F02C 7/045 |
| | | | | 415/119 |
| 2004/0094359 | A1 * | 5/2004 | Porte | F02C 7/045 |
| | | | | 181/210 |
| 2006/0169533 | A1 | 8/2006 | Patrick | |
| 2009/0053043 | A1 * | 2/2009 | Moon | F01D 25/24 |
| | | | | 415/200 |
| 2014/0321999 | A1 * | 10/2014 | Guilbert | F02C 7/045 |
| | | | | 415/182.1 |

FOREIGN PATENT DOCUMENTS

| | | | | | |
|---|---|---|---|---|---|
| FR | 2975735 | A1 * | 11/2012 | ........... | F01D 21/045 |
| FR | 3004750 | A1 * | 10/2014 | .............. | F02C 7/045 |
| FR | 3005100 | A1 * | 10/2014 | ........... | B64D 33/02 |
| FR | 3092136 | A1 * | 7/2020 | ........... | F01D 25/246 |
| FR | 3100834 | A1 * | 3/2021 | ........... | F01D 25/246 |
| FR | 3108679 | A1 * | 10/2021 | | |
| FR | 3108680 | A1 * | 10/2021 | ............. | B64D 27/16 |
| WO | 2014/197035 | A2 | 12/2014 | | |

OTHER PUBLICATIONS

Written Opinion dated May 13, 2020, issued in corresponding International Application No. PCT/FR2020/000027, filed Feb. 7, 2020, 7 pages.

English translation of Written Opinion mailed May 13, 2020, issued in corresponding International Application No. PCT/FR2020/000027, filed Feb. 7, 2020, 10 pages.

International Preliminary Report on Patentability mailed Aug. 10, 2021, issued in corresponding International Application No. PCT/FR2020/000027, filed Feb. 7, 2020, 8 pages.

* cited by examiner

TURBOMACHINE FAN

TECHNICAL FIELD OF THE INVENTION

The present invention relates to a ring assembly as well as a fan and a turbomachine equipped with such a ring assembly.

DISCLOSURE OF THE INVENTION

FIG. 1 represents a ring assembly 10 of longitudinal axis A according to known technique, which comprises a housing 12 which is an annular structural part supporting on its radially inner face a longitudinal succession of panels 14, 16, 18. At the upstream end, a one-piece annular acoustic panel 14 is provided, so as to reduce upstream noise emissions. It can be seen that a fan wheel 20 is arranged downstream of the upstream panel 14 and is surrounded by a support panel 16 of an abradable material to limit airflow at the top of blades of the fan wheel 20. The fan housing 12, as it is commonly called, comprises, at its downstream end, a radial annular flange 24 attached to a corresponding radial annular flange of an intermediate housing of the turbomachine, having means for attachment to the aircraft.

FIG. 2 illustrates, in perspective, the acoustic panel 14 of the upstream end of the fan 22. FIG. 3 shows the same acoustic panel 10 in cross-section. The acoustic panel 14 comprises a honeycomb structure 26, for example of the honeycomb type, with the cells 28 being radially oriented. The cells 28 are covered with a carbon fabric, using a draping technique.

To secure the acoustic panel 14 to the housing 12, recesses 30 or grooves are provided in the radially outer face of the panel 14, each of which accommodates an L-shaped metal bracket 32. Each bracket 32 is riveted through the panel 14 and comprises a radially outer portion 32a bolted to a radial portion 34a of a metal bracket 34 of the fan 22 housing 12 (FIG. 4).

This type of assembly is generally carried out by means of at least ten pairs of metal brackets 32, 34, which requires a long assembly time and complicates the operation itself. In addition, during maintenance operations, the large number of connecting elements is problematic in terms of the time required to handle these elements. Also, these fasteners induce a hyperstatic fixing of the housing 12 with the acoustic panel 14 inducing a static overstress in the bolted connections of the brackets 32, 34, an abnormal compression of the panel connection joints. Finally, the creation of grooves greatly complicates the manufacturing process of the acoustic panel since it is necessary to have a variation in the radial dimension of the honeycomb structure.

The invention particularly aims to provide a simple, effective and inexpensive solution to the above problems.

SUMMARY OF THE INVENTION

The document relates to a ring assembly with a longitudinal axis for a turbomachine comprising a housing made of woven composite material carrying on its radially inner face an acoustic panel with a cellular structure covered with a composite material, characterized in that the housing comprises at least one radial recess in which at least one protruding part projecting radially outwards from the radially outer face of the annular acoustic panel is engaged. According to the proposed technological arrangement, the connection between the housing and the acoustic panel is form-fitting and allows the acoustic panel to be locked relative to the housing. The radial recess on the housing can be produced during the weaving of the housing by means of a counter-form, which does not lead to the risk of cutting fibres. The protruding parts of the acoustic panel can be made by moulding (during the draping process), which is easy to do. The honeycomb structure can now have a uniform thickness in the circumferential direction, which facilitates its manufacture. It is thus possible to use a plurality of sectors of honeycomb structure juxtaposed to each other. The acoustic panel can be sectorised but is preferably formed in one piece over 360°.

Each protruding part may be formed by a longitudinal rib.

Each recess may have a complementary shape to said one protruding part. In particular, each recess and each projection may have a substantially uniform cross-section in the longitudinal direction, so as to facilitate the translational mounting of the panel on the housing. For example, each protruding part may have a substantially rectangular cross-section and extend longitudinally from one end of the panel to the other.

In order to prevent axial movement of the panel relative to the housing in the event that the relative shapes of the protruding part and recesses of the housing do not permit such movement to be prevented, a member for connecting the housing to the acoustic panel may then pass through the housing from the outside and be inserted into each protruding part of the acoustic panel.

Each protruding part, which may be a rib, may have two side faces connected to each other by a bottom face, said two side faces being substantially flat and inclined relative to each other so as to converge towards each other in a radially outward direction. This particular conformation of the ribs in conjunction with the complementary shape of the housing recesses facilitates the assembly of the acoustic panel.

Also, the acoustic panel may comprise at least three protruding parts each formed by a longitudinal rib, the ribs being evenly distributed around the longitudinal axis of the annular assembly.

Also, an anti-wear strip can be applied to each side face of a rib. This limits the wear of the housing recesses by friction of the acoustic panel, during operation, due to the vibrations of the turbomachine. The use of anti-wear tape, in Teflon for example, is interesting to avoid between the composite of the housing and the composite of the acoustic panel.

In one embodiment, the housing is made by weaving carbon fiber and injecting resin.

The document also relates to a turbomachine fan comprising a ring assembly as indicated above and at least one fan wheel surrounded by the housing and arranged downstream of the acoustic panel. It also refers to a turbomachine comprising such a fan.

The invention will be better understood and other details, characteristics and advantages of the invention will appear when reading the following description, which is given as a non-limiting example, with reference to the attached drawings.

DETAILED DESCRIPTION OF THE INVENTION

Figure 1:
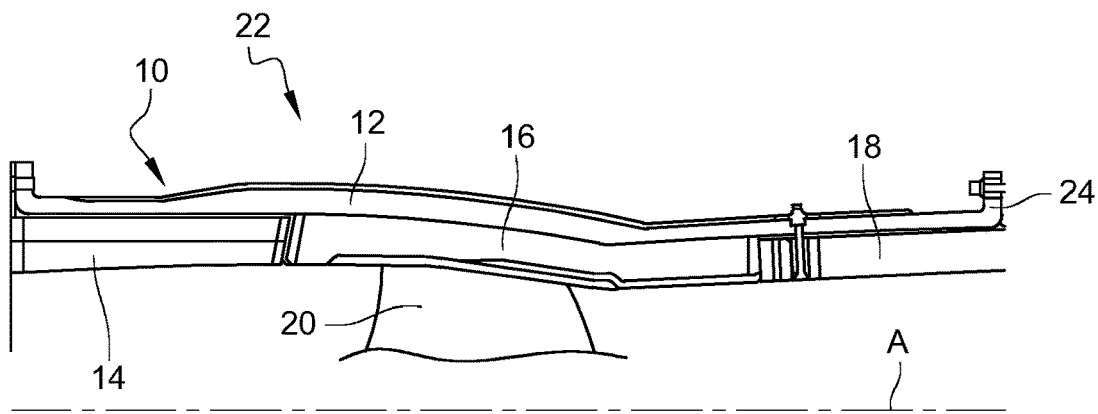
FIG. 1 already described above, is a schematic perspective view of a turbomachine according to the prior art.
Figure 2:
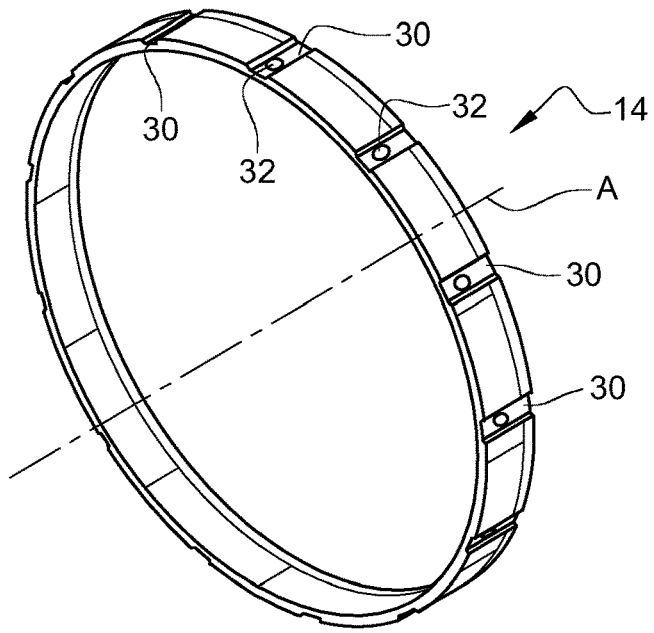
FIG. 2, already described above, is a schematic view of an annular acoustic panel arranged at the upstream end of a fan as shown in FIG. 1.
Figure 3:
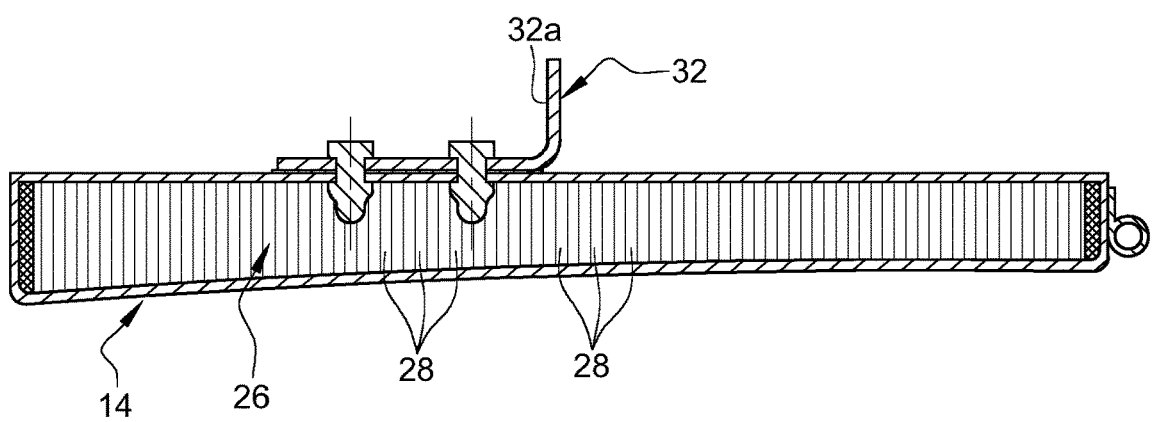
FIG. 3, already described above, is a schematic in longitudinal section of an acoustic panel showing the means of attachment of the acoustic panel.
Figure 4:
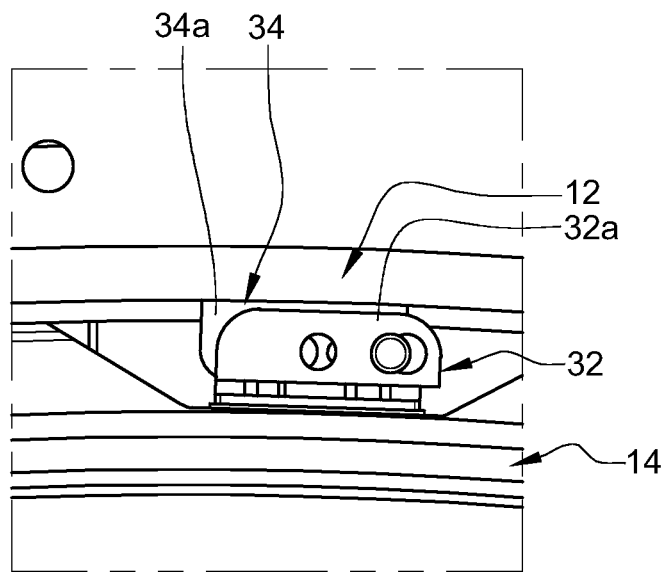
FIG. 4, already described above, is a schematic view of the attachment of the acoustic panel to an outer housing.

Reference is now made to FIGS. 5 to 8 which show the connection of the acoustic panel 36 and a housing 38 in a ring assembly 39 according to the invention.

It is thus proposed to make longitudinal or axial recesses 40 on the inner face of the housing 38 which is made by weaving carbon fibres and injecting resin. These longitudinal recesses 40 form grooves with a substantially rectangular cross section. The cross-section of the grooves is substantially constant in longitudinal direction A.

The acoustic panel 36 comprises an internal honeycomb structure (not shown) similar to that described with reference to the prior art, with cells oriented in the radial direction and covered with a layer of a carbon or glass fiber composite material. The acoustic panel 36 includes protruding parts 42 formed by longitudinal or axial ribs. Each rib 42 has a substantially uniform cross-section from one axial end of the acoustic panel 36 to the other. The cross-section may be substantially rectangular in shape, although it will be noted that the flanks may be inclined as will be discussed below.

Figure 7:
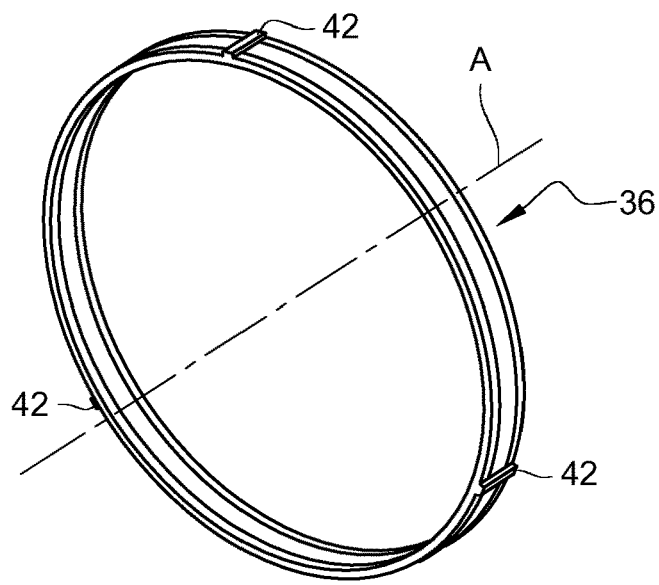
FIG. 7 is a schematic view of an acoustic panel for use in an air inlet sleeve according to the invention.
Figure 8:
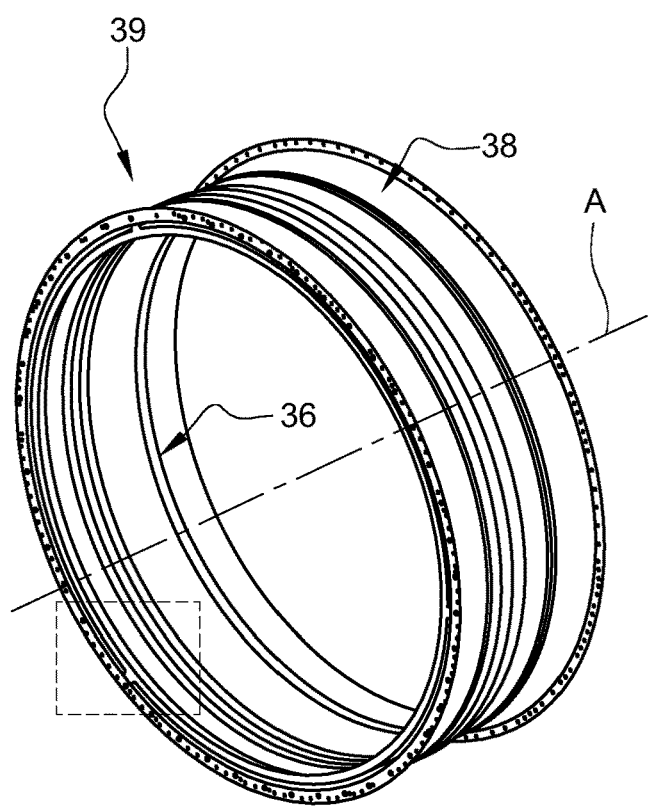
FIG. 8 is a schematic view of a housing for use in A ring assembly according to the invention.
Figure 9:
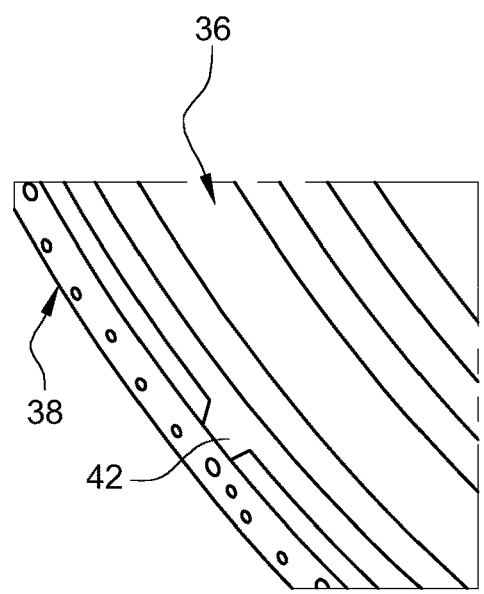
FIG. 9 is a larger scale schematic view of the dotted area in FIG. 8.

As shown in FIG. 7 and FIG. 8, the ribs 42 may be evenly distributed around the longitudinal axis A and may be three in number as well as the grooves 38 in the housing.

Thus shaped, the recesses 40 of the housing 38 and the ribs 42 of the acoustic panel 36 have complementary shapes that allow axial engagement of the acoustic panel 36 within the housing 38 by sliding the ribs 42 of the acoustic panel 36 into the grooves 40 of the housing 38.

Figure 5:
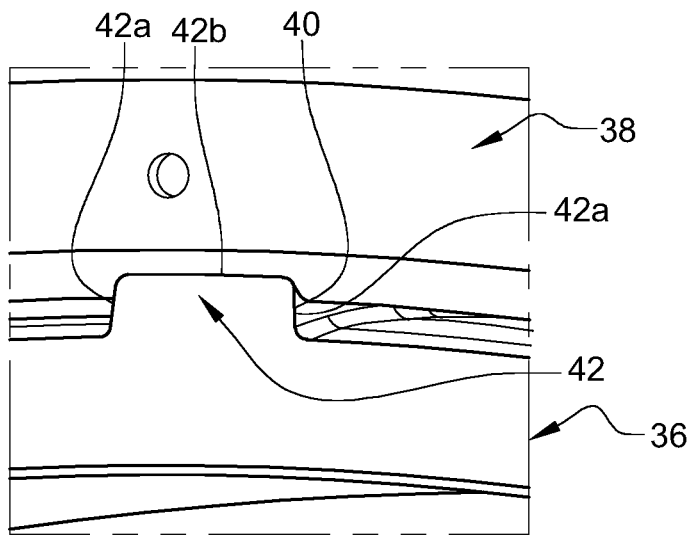
FIG. 5.
Figure 6:
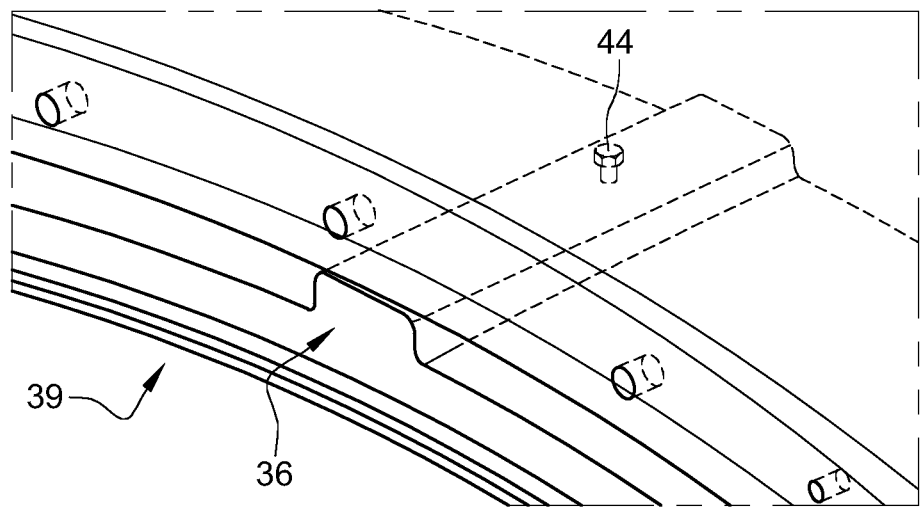
FIG. 6 are schematic views of the principle of assembly of an acoustic panel with a housing according to the invention.

As can be seen in FIGS. 5 and 6, each rib 42 comprises two side faces 42a, i.e. two circumferential end faces, each face 42a extending longitudinally. Furthermore, the two side faces 42a of a rib 42 are substantially flat and inclined relative to each other so as to converge towards each other in a radially outward direction. The side faces 42a of a rib 42 are connected to each other by a bottom face 42b. In this configuration, each groove 40 in the housing 38 then has a complementary shape with equally obliquely inclined faces. This conformation allows for easier mounting of the acoustic panel 36.

To prevent longitudinal movement of the acoustic panel 36 in the housing 38, members 44 are provided for locking the acoustic panel 36 to the housing 38. Thus, a fastener 44 is inserted from the outside of the housing 38 and so as to be inserted into a rib 42 of the acoustic panel 38. Specifically, each fastener 44 extends through the housing 38 and then through the bottom face 42b of a rib 42 and is inserted into the honeycomb structure of the acoustic panel 36. The fastener 44 may be an insert such as a blind rivet.

Each side face 42a of a rib 42 may be covered with an anti-wear strip to limit wear of the housing 38 due to vibration of the acoustic panel 36, during operation. These anti-wear strips can be made of Teflon for example.

The connection of the acoustic panel 36 to the housing 38 proposed herein allows the use of a honeycomb structure having a constant thickness in the circumferential direction, which facilitates the manufacture of the acoustic panel 36 as well as its assembly. In addition, the acoustic attenuation achieved by the honeycomb structure is improved.

The invention claimed is:

1. A ring assembly of a longitudinal axis for a turbomachine, comprising a housing made of woven composite material carrying on an radially inner face an acoustic panel with a cellular structure covered with a composite material, wherein the housing comprises at least one radial recess in which at least one protruding part projecting radially towards an outside of a radially outer face of the annular acoustic panel is engaged, each projecting portion being formed by a longitudinal rib, and each rib having two side faces connected to each other by a bottom face, said two side faces being flat and inclined relative to each other to converge towards each other in a radially outward direction.

2. The ring assembly of claim 1, wherein each recess has a complementary shape to said at least one protruding part.

3. A ring assembly according to claim 1, wherein the acoustic panel comprises at least three longitudinal ribs evenly distributed around the longitudinal axis.

4. The ring assembly of claim 1, wherein a wear strip is applied to each of the side faces of at least one of the ribs.

5. The ring assembly according to claim 1, wherein a member for connecting the housing to the acoustic panel passes through the housing from the outside and is inserted into each projecting portion of the acoustic panel.

6. The ring assembly according to claim 1, wherein each recess and each protruding part has a uniform cross-section in the longitudinal direction.

7. The ring assembly according to claim 1, wherein the housing is made by weaving carbon fibers and injecting resin.

8. A turbomachine fan comprising the ring assembly according to claim 1 and at least one fan wheel arranged downstream of the annular acoustic panel and surrounded by the housing.

9. A turbomachine comprising the turbomachine fan of claim 8.

* * * * *